United States Patent [19]

Fleetham

[11] Patent Number: 4,907,451
[45] Date of Patent: Mar. 13, 1990

[54] LIQUID LEVEL INDICATING DEVICE

[75] Inventor: Nicholas R. Fleetham, Chelmsford, United Kingdom

[73] Assignee: Ford Motor Company, Dearborn, Mich.

[21] Appl. No.: 211,003

[22] Filed: Jun. 24, 1988

[30] Foreign Application Priority Data

Jun. 26, 1987 [GB] United Kingdom ............... 87105083

[51] Int. Cl.⁴ ..................... G01F 23/18; H01H 35/18
[52] U.S. Cl. ............... 73/291; 200/61.45 M; 324/260; 340/618
[58] Field of Search ............... 324/167, 168, 178, 260; 340/52 H, 59, 440, 450, 450.2; 200/61.45 M, 61.45; 73/291, 290 R

[56] References Cited

U.S. PATENT DOCUMENTS

| | | |
|---|---|---|
| 2,290,869 | 7/1942 | Fingold . |
| 3,168,689 | 2/1965 | Gelenius . |
| 3,460,038 | 8/1969 | Ziegler . |
| 3,784,973 | 1/1974 | Burgett et al. ............ 340/450.2 |
| 3,882,957 | 5/1975 | Fritz ................... 340/52 H |
| 3,886,518 | 5/1975 | Bozoian ................ 340/59 |
| 3,921,129 | 11/1975 | Sumida ................ 340/52 H |
| 3,946,311 | 3/1976 | Baker et al. . |
| 4,016,535 | 4/1977 | Dinlocker ............ 200/61.45 M X |
| 4,035,789 | 7/1977 | Akita et al. . |
| 4,230,984 | 10/1980 | Taylor . |
| 4,291,268 | 9/1981 | Okuyama . |
| 4,492,920 | 1/1985 | Reenstra . |
| 4,680,541 | 7/1987 | Barbiaux et al. . |
| 4,799,047 | 1/1989 | Saitoh ............... 73/450.2 X |

FOREIGN PATENT DOCUMENTS 1373345 11/1974 United Kingdom .
2054162B 3/1984 United Kingdom .

OTHER PUBLICATIONS

*Insight,* vol. No. 15, dated Mar. 1987, p. 23.

Primary Examiner—Daniel M. Yasich
Attorney, Agent, or Firm—Paul K. Godwin, Jr.; Clifford L. Sadler

[57] ABSTRACT

A liquid level indicating device such as the fuel gauge 10 in a motor vehicle is of the type which does not return to zero when the ignition 24 is switched of. In order to prevent false readings arising when the fuel in the tank sloshes about, a tilt switch 22 is provided in series with the ignition switch to depower the fuel gauge 10, which then continues to register the previous reading, if the motion or attitude of the vehicle changes. The tilt switch will close when the vehicle returns to a low level of acceleration and a level attitude operating state and power will be restored to the gauge. The gauge then reverts to direct reading of the signal from a sender unit 28 in the fuel tank.

9 Claims, 1 Drawing Sheet

LIQUID LEVEL INDICATING DEVICE

FIELD OF THE INVENTION

This invention relates to a liquid level gauge and, in particular, to a fuel level gauge for use in a motor vehicle.

SUMMARY OF THE INVENTION

A known problem with motor vehicle fuel level gauges is that the signal sent to the gauge from the sender unit in the tank varies as the fuel sloshes about in the tank. For example when the vehicle is cornering or accelerating, the reading on the fuel gauge varies depending on the orientation of the fuel in the tank. It is an object of the present invention to provide a gauge which is not affected by such fluctuations.

Electrical fuel gauges are known where the gauge pointer does not return to a zero position when the ignition switch is turned off. These gauges make use of interacting magnetic fields that cause the pointer to rotate and provide a fuel level reading. When the ignition switch is turned off the magnetic fields are reduced to zero and there is no restoring force which would return the pointer to a zero reading. The gauge pointer therefore continues to register the reading which corresponds to the fields applied just prior to the moment the ignition switch was turned off.

The present invention provides an improved device for indicating the fuel level in a motor vehicle fuel tank. The device includes a sender unit; a gauge, wherein the gauge is of the type which does not return to zero when the power supply to the device is interrupted; and a tilt switch mounted in the vehicle so as to be sensitive to motion changes and non-level orientation of the vehicle. The function of the tilt switch is to interrupt the supply of power to the device when the motion or level orientation of the vehicle changes by more than a predetermined amount.

The tilt switch is mounted in such a manner that a normally continuous conducting path between two switch contacts is broken if the inclination of the vehicle changes by more than a certain amount from the horizontal reference, or if a positive or negative acceleration force above a certain level is applied to the vehicle. In operation, the gauge pointer will register the reading corresponding to the signal applied immediately prior to the change in inclination or acceleration. The gauge pointer will continue to hold that reading until the state of the vehicle returns to a horizontal orientation or a low level of acceleration, whereupon the tilt switch once again closes to supply power to the device.

The gauge is preferably an air core type which comprises two sets of coils oriented to produce electromagnetic fields oriented at 90° to one another. One set of coils is connected through the ignition switch to the vehicle power supply to produce a constant electromagnetic field that serves as a reference. The other set of coils is connected to the sender unit to received a varying signal from the unit to produce an electromagnetic field that varies with the signal. A permanent magnetic member is arranged in the resultant electromagnetic field produced by the two sets of coils and adapted to carry a needle pointer that rotationally moves over a scale in accordance with the resultant electromagnetic field produced by the two sets of coils. U.S. Pat. Nos. 3,168,689 and 3,460,038 illustrate the construction and use of such gauges and are incorporated herein by reference.

DETAILED DESCRIPTION OF THE PREFERRED EMBODIMENT

Figure 1:
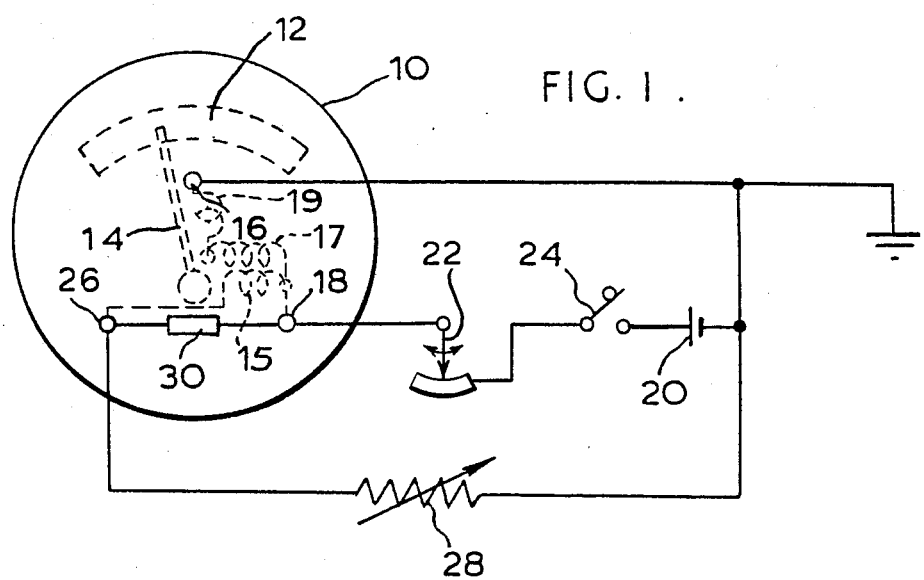
FIG. 1 is a schematic circuit diagram of an indicating device in accordance with the invention.

FIG. 1 shows a gauge 10 with a reading scale 12 and a needle pointer 14 indicated in dotted lines. The gauge has three electrical terminals. Terminal 16 is the ground connection. Terminal 18 is connected to a 12 volt power source (a battery 20) through switches 22 and 24. Terminal 26 is connected to a variable resistor 28 which is provided in the fuel tank sender unit mentioned above. The resistance value of variable resistor 28 varies with the level of fuel in the fuel tank, in a conventional manner. A calibration resistor 30 is connected between the terminals 18 and 26.

Switch 24 is a conventional ignition switch for the vehicle and will be closed while the vehicle is in operation. Switch 22 is a normally closed tilt switch, such as a conventional mercury switch, mounted so that it remains closed while the vehicle is in a horizontal position and during relatively low rates of acceleration or deceleration. However, if the vehicle is inclined on a slope, or if it accelerates or decelerates at a relatively high rate, the tilt switch 22 opens to interrupt the circuit and thereby prevent battery current from reaching the terminals 18 or 26 (the degree of inclination or change in speed required to interrupt the circuit is determined by the selection of the tilt switch 22).

The gauge 10 is of a known air core type where the needle pointer 14 is linked by a shaft to a permanent magnet disc (not shown). The disc is surrounded by coils of wire wound onto a plastic bobbin. There are two sets of inductive coils wound at 90° to one another. One set includes a double winding 17 and 19, which passes a constant reference current when the switches 22 and 24 are both closed. This produces a constant electromagnetic field at 90° to these coils, which together form the "ignition" winding.

The other set of coils 15 forms the "sensor" winding and is connected to both the source of electrical energy, through switches 22 and 24, and the variable resistance 28 of the fuel tank sender unit. A variable current, depending upon the resistance of the resistor 28, is passed through this winding. The strength of the generated electromagnetic field in the sensor winding depends upon the value of the current reaching the terminal 26; and the orientation of that field is at 90° with respect to the field produced by the ignition winding.

Since the two sets of windings produce electromagnetic fields at right angles to one another, the combined effect of these is to produce a resultant electromagnetic field with an orientation somewhere between the two. With a low current in the sensor winding this orientation is close to that which would be produced solely by the field of the ignition winding; and with a high current in the sensor winding, the orientation is closer to the field produced solely by the sensor winding.

The magnetic disc connected to the needle pointer 14 has its poles arranged such that when the ignition is on and there is little or no current in the sensor winding, the needle pointer 14 gives a zero reading with respect to the scale 12. As the current in the sensor winding increases, the orientation of the overall field swings around, causing the magnetic disc and the needle to rotate.

When either of the switches 22 and 24 is opened (resulting from a change in orientation of the vehicle or from the ignition switch being turned off), current immediately stops conducting through the ignition and the sensor windings. There is no restoring force which would thereafter move the needle pointer 14. Therefore, the needle pointer 14 remains in the position at which it was set immediately prior to the opening of the circuit.

In operation, the gauge only responds to a signal from the sender unit when the vehicle is in a normal orientation level and at a condition of low acceleration or deceleration. At other times, the reading on the gauge will be "historical" and will refer to the signal received at the last time when the vehicle was in its normal orientation. The interval between such readings is extremely small, and not noticeable to the vehicle operator from an observation of the gauge.

Figure 2:
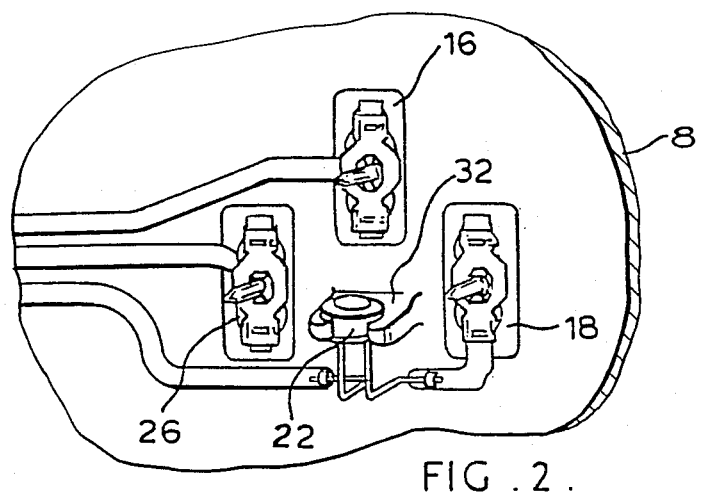
FIG. 2 is the rear view of an instrument panel unit showing some details of a practical embodiment of the device.

FIG. 2 shows a view of the back of an instrument panel casing 8 which incorporates the gauge 10, and indicates the positions of the terminals 16, 18 and 26. The tilt switch 22 is mounted in a bracket 32 arranged so that the switch will be horizontal when the vehicle is level. The sensitivity of the switch can be chosen in accordance with the desired characteristics, but it is likely that a switch which is designed to open at an inclination of 5° from the horizontal would be suitable for this device. Such a switch is commercially available as part No. MMC/10 from Engel & Gibbs Ltd., 21 Grechhill Crescent, Watford, Great Britain.

The gauge described can also include damping to prevent excessive oscillation of the needle. However, the presence of the tilt switch substantially reduces the likelihood of oscillation, and thus the amount of damping needed can be considerably reduced or even omitted.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A vehicle mounted liquid level indicating device, electrically connected to a liquid level sensor that is located within a liquid containing tank and has electrical characteristics which vary in correspondence to changes in the level of liquid within the tank, comprising:

an air core meter movement gauge having a first set of inductive coils for receiving a reference electrical current from a source of electrical energy and producing a first electromagnetic field, a second set of inductive coils oriented to produce a second electromagnetic field oriented orthogonally with respect to the field generated by said first set of inductive coils and connected to said source of electrical energy and to said liquid level sensor and;

a normally closed tilt switch located between said source of electrical energy and said first and second sets of inductive coils for interrupting the supply of electrical current to said gauge whenever said vehicle is subjected to acceleration or deceleration forces greater than a predetermined amount or said vehicle becomes oriented in a non-level condition with respect to the horizontal beyond a predetermined limit.

2. A device as in claim 1, wherein said second set of inductive coils is electrically connected between said tilt switch and said liquid level sensor.

3. A device as in claim 2, wherein said first set of inductive coils is electrically connected between said tilt switch and ground.

4. A device as in claim 3, wherein said tilt switch is physically mounted within said vehicle to be normally closed when said vehicle is oriented level with the horizontal.

5. A device as in claim 4, wherein said tilt switch becomes opened to interrupt the supply of electrical current to said gauge when said vehicle is oriented at an angle that exceeds five (5) degrees from the horizontal.

6. A vehicle mounted liquid level indicating device, electrically connected to a liquid level sensor that is located within a liquid containing tank and has electrical characteristics which vary in correspondence to changes in the level of liquid within the tank, comprising:

an air core meter movement gauge having a first set of inductive coils for receiving a constant electrical current from a source of electrical energy and producing a first electromagnetic field, a second set of inductive coils oriented to produce a second electromagnetic field oriented orthogonally with respect to the field generated by said first set of inductive coils and connected to said source of electrical energy and to said liquid level sensor;

a normally closed tilt switch located between said source of electrical energy and said first and second sets of inductive coils for interrupting the supply of electrical current to said gauge whenever said vehicle is subjected to acceleration or deceleration forces greater than a predetermined amount or said vehicle becomes oriented in a non-level condition with respect to the horizontal beyond a predetermined limit; and an ignition switch between said source of electrical energy and said tilt switch.

7. A vehicle mounted liquid level indicating device, electrically connected to a liquid level sensor that is located within a liquid containing tank and has electrical characteristics which vary in correspondence to changes in the level of liquid within the tank, comprising:

an air core meter movement gauge having a first set of inductive coils for receiving a reference electrical current from a source of electrical energy and producing a first electromagnetic field, a second set of inductive coils connected to said source of electrical energy and to said liquid level sensor, and oriented to produce an electromagnetic field oriented orthogonally with respect to said first field generated by said first set of inductive coils, whereby the two fields influence each other to provide a resultant electromagnetic field having an orientation that varies with the strength of said second field, and a permanent magnet mounted for reactive rotation solely in response to the changes in orientation of said resultant electromagnetic field;

a normally closed tilt switch located between said source of electrical energy and said first and second sets of inductive coils for interrupting the supply of electrical current to said gauge whenever said vehicle is subjected to acceleration or deceleration forces greater than a predetermined amount or said vehicle becomes oriented in a non-level condition with respect to the horizontal beyond a predetermined limit.

8. A device as in claim 7, wherein said permanent magnet is connected to a needle pointer which indicates the degree of rotation experienced by said permanent magnet.

9. A device as in claim 8, wherein said permanent magnet is unreactive and does not rotate when said tilt switch is opened.

* * * * *